(12) United States Patent
Akiyama (10) Patent No.: US 7,382,539 B2
(45) Date of Patent: Jun. 3, 2008

(54) PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 107 days.

(21) Appl. No.: 11/531,947

(22) Filed: Sep. 14, 2006

(65) Prior Publication Data

US 2007/0091269 A1    Apr. 26, 2007

(30) Foreign Application Priority Data

Oct. 14, 2005    (JP) .............................. 2005-299718

(51) Int. Cl.
*G02B 3/00* (2006.01)
*G03B 21/00* (2006.01)
*G03B 21/14* (2006.01)

(52) U.S. Cl. ........................... 359/649; 353/32; 353/38
(58) Field of Classification Search ........ 359/649–651; 353/32, 38
See application file for complete search history.

(56) References Cited

U.S. PATENT DOCUMENTS 6,513,953 B1 * 2/2003 Itoh ........................... 362/331

FOREIGN PATENT DOCUMENTS

JP        A 8-304739        11/1996

* cited by examiner

*Primary Examiner*—William C Choi
(74) *Attorney, Agent, or Firm*—Oliff & Berridge, PLC (57) ABSTRACT

A projector includes an illuminating device having a light source device, a first lens array having plural first small lenses, a second lens array having plural second small lenses corresponding to the plural first small lenses, and a superposing lens; an electro-optic modulator, and a projection optical system. A conjugate point of an image forming area in the electro-optic modulator is located on the light source device side or the projection optical system side from the vertex of a lens curved surface in each first small lens of the first lens array. An eccentric amount of each second small lens in the second lens array is adjusted such that each principal ray of the partial light beam passing through each first small lens in the first lens array passes an approximately central portion of the image forming area on the image forming area of the electro-optic modulator.

5 Claims, 4 Drawing Sheets

PROJECTOR

BACKGROUND

1. Technical Field

The present invention relates to a projector.

2. Related Art

A projector having a first lens array, a second lens array and a superposing lens as a light integrator optical system is formerly known (for example, see JP-A-8-304739 (FIG. 11)). In accordance with the former projector, an illuminating light beam emitted from a light source device is divided into plural partial light beams by the first lens array having plural first small lenses. Each of these partial light beams is superposed in an illuminated area (an image forming area of an electro-optic modulator) by the functions of the superposing lens and the second lens array having plural second small lenses corresponding to the plural first small lenses. Therefore, it is possible to approximately uniform an in-plane light intensity distribution of light for irradiating the image forming area of the electro-optic modulator.

In the former projector, a conjugate point of the image forming area in the electro-optic modulator is located at the vertex of a lens curved surface in each first small lens of the first lens array. Therefore, for example, when dust is attached onto the lens curved surface of the first small lens and a flaw, etc. exist on the lens curved surface, images of such dust, a flaw, etc. are focused and formed on the image forming area. Therefore, the images of the dust, the flaw, etc. are included within an image projected on a projecting face. Accordingly, a problem exists in that image quality of the projecting image is reduced.

SUMMARY

An advantage of some aspects of the invention is to provide a projector able to restrain that the image quality of the projecting image is reduced since dust is attached onto the lens curved surface of the first small lens and a flaw, etc. exist on the lens curved surface.

A projector according to an aspect of the invention comprises: an illuminating device having a light source device that emits an illuminating light beam on the side of an illuminated area; a first lens array having plural first small lenses that divides the illuminating light beam emitted from the light source device into plural partial light beams; a second lens array having plural second small lenses corresponding to the plural first small lenses; and a superposing lens that superposes the respective partial light beams emitted from the plural second small lenses in the illuminated area; an electro-optic modulator that modulates the illuminating light beam from the illuminating device; and a projection optical system that projects the illuminating light beam modulated by the electro-optic modulator. A conjugate point of an image forming area in the electro-optic modulator is located on the light source device side or the projection optical system side from the vertex of a lens curved surface in each first small lens of the first lens array. An eccentric amount of each second small lens in the second lens array is adjusted such that each principal ray of the partial light beam passing through each first small lens in the first lens array passes an approximately central portion of the image forming area on the image forming area of the electro-optic modulator.

Therefore, in accordance with the projector of one aspect according to the invention, the conjugate point of the image forming area is located on the light source device side or the projection optical system side from the vertex of the lens curved surface in each first small lens of the first lens array. Therefore, the image forming area and the vertex of the lens curved surface of the first small lens are not set to a conjugate relation. Even when dust is attached to the lens curved surface of the first small lens and a flaw, etc. exist on the lens curved surface, it is restrained that images of such dust, a flaw, etc. are focused and formed on the image forming area. As its result, it is possible to restrain that the images of the dust, the flaw, etc. are projected within an image projected on a projecting face, and also restrain that image quality of the projecting image is reduced.

Thus, the projector according to one aspect of the invention becomes a projector able to restrain that the image quality of the projecting image is reduced since the dust is attached to the lens curved surface of the first small lens and the flaw, etc. exist on the lens curved surface.

When the conjugate point of the image forming area is located on the light source device side (or the projection optical system side) from the vertex of the lens curved surface in each first small lens of the first lens array, the forming position of an image of each first small lens in the first lens array is not a position on the image forming area, but becomes a position shifted on the projection optical system side (the light source device side from the image forming area when the conjugate point of the image forming area is located on the projection optical system side from the vertex of the lens curved surface in each first small lens of the first lens array) from the image forming area. Therefore, each principal ray of the partial light beam passing through each first small lens in the first lens array passes a position shifted from the approximately central portion of the image forming area without passing the approximately central portion of the image forming area on the image forming area.

A concrete explanation will be made. As shown in FIGS. 3A to 3D described later, when the conjugate point of the image forming area is located on the light source device side from the vertex of the lens curved surface in each first small lens of the first lens array, the principal ray of the partial light beam passing through the first small lens arranged above an illuminating optical axis passing the approximately central portion of the first lens array passes a position shifted in the upward direction from the approximately central portion of the image forming area. The principal ray of the partial light beam passing through the first small lens arranged below the illuminating optical axis passes a position shifted in the downward direction from the approximately central portion of the image forming area. The principal ray of the partial light beam passing through the first small lens arranged leftward from the illuminating optical axis passes a position shifted in the leftward direction from the approximately central portion of the image forming area. The principal ray of the partial light beam passing through the first small lens arranged rightward from the illuminating optical axis passes a position shifted in the rightward direction from the approximately central portion of the image forming area.

Further, when the conjugate point of the image forming area is located on the projection optical system side from the vertex of the lens curved surface in each first small lens of the first lens array, the principal ray of the partial light beam passing through the first small lens arranged above the illuminating optical axis passing the approximately central portion of the first lens array passes a position shifted in the downward direction from the approximately central portion of the image forming area. The principal ray of the partial light beam passing through the first small lens arranged below the illuminating optical axis passes a position shifted in the upward direction from the approximately central portion of the image forming area. The principal ray of the partial light beam passing through the first small lens arranged leftward from the illuminating optical axis passes a position shifted in the rightward direction from the approximately central portion of the image forming area. The principal ray of the partial light beam passing through the first small lens arranged rightward from the illuminating optical axis passes a position shifted in the leftward direction from the approximately central portion of the image forming area.

Therefore, it becomes difficult to superpose all of the respective partial light beams emitted from the plural first small lenses of the first lens array on the image forming area so that the uniform degree of light irradiated to the image forming area is reduced. Further, the light amount of the illuminating light beam irradiated to an area outside the image forming area is increased, and utilization efficiency of light in the image forming area is reduced.

As its result, it becomes difficult to obtain uniform and bright in-plane display characteristics on the projecting face.

However, in accordance with the projector according to one aspect of the invention, the eccentric amount of each second small lens in the second lens array is adjusted such that each principal ray of the partial light beam passing through each first small lens in the first lens array passes the approximately central portion of the image forming area on the image forming area. Therefore, each principal ray of the partial light beam passing through each first small lens in the first lens array passes the approximately central portion of the image forming area on the image forming area.

Therefore, even when the forming position of an image of each first small lens in the first lens array is a position shifted on the light source device side or the projection optical system side from the image forming area, all of the respective partial light beams emitted from the plural first small lenses of the first lens array can be superposed on the image forming area. Therefore, a reduction of the uniform degree of light irradiated to the image forming area can be restrained. Further, since the increase of a light amount of the illuminating light beam irradiated to an area outside the image forming area can be restrained, the reduction of utilization efficiency of light in the image forming area can be restrained.

As its result, uniform and bright in-plane display characteristics can be obtained on the projecting face.

In the projector according to one aspect of the invention, the distance between the conjugate point and the vertex of the lens curved surface in each first small lens of the first lens array preferably lies within a range of 0.5 mm to 5.0 mm.

When the distance between the conjugate point of the image forming area and the vertex of the lens curved surface in each first small lens of the first lens array is less than 0.5 mm and dust is attached to the lens curved surface of the first small lens and a flaw, etc. exist on the lens curved surface, there is a possibility that images of such dust, a flaw, etc. are focused and formed on the image forming area. In contrast to this, when the distance between the conjugate point of the image forming area and the vertex of the lens curved surface in each first small lens of the first lens array exceeds 5.0 mm, an image of each first small lens in the first lens array is focused and formed in a position comparatively greatly separated from the image forming area. Therefore, the light amount of the illuminating light beam irradiated to the area outside the image forming area is further increased. When the image of each first small lens in the first lens array is thus focused and formed in the position comparatively greatly separated from the image forming area, it is not easy to adjust the eccentric amount of each second small lens in the second lens array such that each principal ray of the partial light beam passing through each first small lens in the first lens array passes the approximately central portion of the image forming area on the image forming area.

From the above viewpoint, the distance between the conjugate point of the image forming area and the vertex of the lens curved surface in each first small lens of the first lens array preferably lies within a range of 0.5 mm to 5.0 mm, and more preferably lies a range of 1.0 mm to 3.0 mm.

In the projector according to one aspect of the invention, the conjugate point is preferably located within the air.

In accordance with such a construction, the conjugate point of the image forming area is located within the air, i.e., does not exist within the first lens array (within an optical medium of the first lens array). Therefore, even when an air bubble, a flaw, etc. exist within the first lens array, it is possible to restrain that images of such an air bubble, a flaw, etc. are focused and formed on the image forming area. As its result, it is possible to restrain that the images of the air bubble, the flaw, etc. are projected within an image projected on the projecting face, and further restrain that image quality of the projecting image is reduced.

The projector according to one aspect of the invention further preferably comprises a polarization converting element arranged between the second lens array and the superposing lens, and emitting each partial light beam divided by the first lens array as linearly polarized light of about one kind uniformed in a polarizing direction.

In accordance with such a construction, the projector according to one aspect of the invention is particularly adapted for a projector having an electro-optic modulator of a type for modulating polarized light, e.g., an electro-optic modulator using a liquid crystal panel.

The projector according to one aspect of the invention further preferably comprises: plural electro-optic modulators that modulates respective plural color lights in accordance with image information as the electro-optic modulator; a color separating light guide optical system that separates the illuminating light beam from the illuminating device into plural color lights and guides the color lights to the respective plural electro-optic modulators; and a color synthesizing optical system that synthesizes the respective color lights modulated by the plural electro-optic modulators and emits the color lights to the projection optical system.

In accordance with such a construction, a projector able to restrain that the image quality of the projecting image is reduced since dust is attached to the lens curved surface of the first small lens and a flaw, etc. exist on the lens curved surface, can be set to a full color projector (e.g., of a three-panel type) excellent in image quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according an embodiment of the invention will next be explained on the basis of embodiment modes shown in the drawings.

Embodiment Mode

Figure 1:
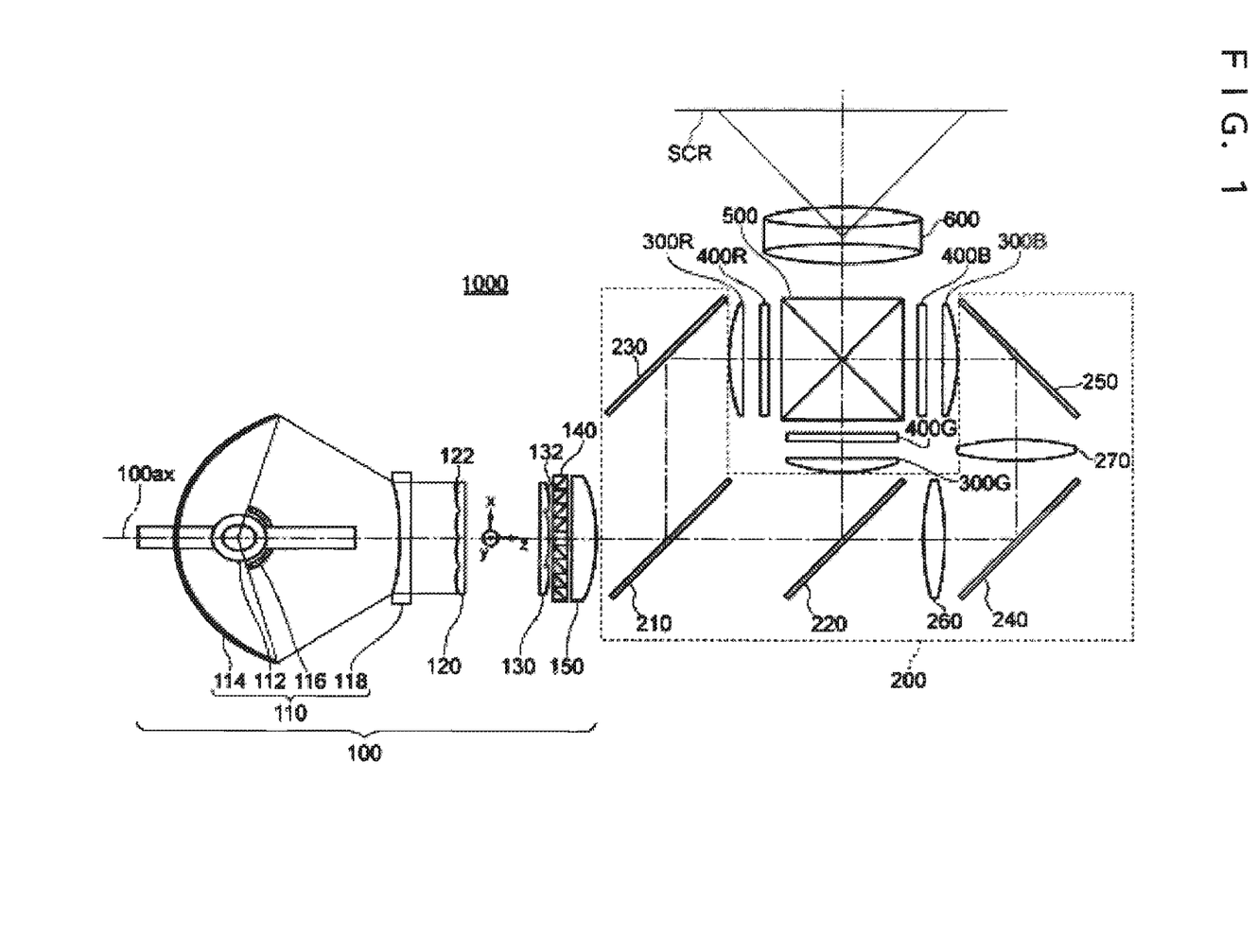
FIG. 1 is a view showing an optical system of a projector 1000 in accordance with embodiment mode 1.

FIG. 1 is a view showing an optical system of a projector 1000 in accordance with an embodiment mode.

In the following explanation, three directions perpendicular to each other are respectively set to the z-axis direction (the direction of an illuminating optical axis 100ax in FIG. 1), the x-axis direction (the direction parallel to the paper face in FIG. 1 and perpendicular to the z-axis), and the y-axis direction (the direction perpendicular to the paper face in FIG. 1 and perpendicular to the z-axis).

As shown in FIG. 1, the projector 1000 in accordance with the embodiment mode has an illuminating device 100 for emitting an illuminating light beam, a color separating light guide optical system 200 for separating light from the illuminating device 100 into three color lights and guiding these color lights to an illuminated area, and three liquid crystal devices 400R, 400G, 400B as an electro-optic modulator for modulating the respective three color lights separated by the color separating light guide optical system 200 in accordance with image information. The projector 1000 also has a cross dichroic prism 500 as a color synthesizing optical system for synthesizing the color lights modulated by the liquid crystal devices 400R, 400G, 400B, and a projection optical system 600 for projecting light synthesized by the cross dichroic prism 500 onto a projecting face of a screen SCR, etc.

The illuminating device 100 has a light source device 110 for emitting the illuminating light beam onto the illuminated area side, a first lens array 120 having plural first small lenses 122 for dividing the illuminating light beam emitted from the light source device 110 into plural partial light beams, and a second lens array 130 having plural second small lenses 132 corresponding to the plural first small lenses 122. The illuminating device 100 also has a polarization converting element 140 for emitting each partial light beam divided by the first lens array 120 as linearly polarized light of about one kind uniformed in a polarizing direction, and a superposing lens 150 for superposing each partial light beam emitted from the polarization converting element 140 in the illuminated area.

The light source device 110 has an elliptical face reflector 114, a light emitting tube 112 having a light emitting center near a first focal point of the elliptical face reflector 114, and an auxiliary mirror 116 as a reflecting means arranged in the light emitting tube 112 and reflecting light emitted from the light emitting tube 112 to the illuminated area side toward the elliptical face reflector 114. The light source device 110 also has a concave lens 118 for approximately converting convergent light reflected on the elliptical face reflector 114 into parallel light, and emitting this parallel light toward the first lens array 120. The light source device 110 emits the light beam with the illuminating optical axis 100ax as a central axis.

The light emitting tube 112 has a tube bulb portion, and a pair of seal portions extending on both sides of the tube bulb portion.

The elliptical face reflector 114 has a neck-shaped portion of a sleeve shape inserted and fixedly attached to one seal portion of the light emitting tube 112, and also has a reflecting concave face for reflecting light radiated from the light emitting tube 112 toward a second focal point position.

The auxiliary mirror 116 is arranged so as to be opposed to the elliptical face reflector 114 through the tube bulb portion of the light emitting tube 112, and returns light not directed to the elliptical face reflector 114 among the light radiated from the light emitting tube 112 to the light emitting tube 112, and makes this returned light incident to the elliptical face reflector 114.

The concave lens 118 is arranged on the illuminated area side of the elliptical face reflector 114. Light from the elliptical face reflector 114 is constructed so as to be emitted toward the first lens array 120.

The first lens array 120 has a function as a light beam dividing optical element for dividing the light from the concave lens 118 into plural partial light beams, and has a construction having the plural first small lenses 122 arrayed in a matrix shape within a plane perpendicular to the illuminating optical axis 100ax. The outer shape of the first small lens 122 is a similar shape with respect to the outer shape of an image forming area S (see FIG. 4B described later) of the liquid crystal devices 400R, 400G, 400B.

The second lens array 130 is an optical element for converging the plural partial light beams divided by the first lens array 120. Similar to the first lens array 120, the second lens array 130 has a construction having the plural second small lenses 132 arrayed in a matrix shape within a plane perpendicular to the illuminating optical axis 100ax.

The first lens array 120 and the second lens array 130 will be described later in detail.

The polarization converting element 140 is a polarization converting element for emitting each partial light beam divided by the first lens array 120 as linearly polarized light of about one kind uniformed in a polarizing direction The polarization converting element 140 has a polarization separating layer for transmitting one linearly polarized light component as it is among polarizing components included in the illuminating light beam from the light source device 110, and reflecting the other linearly polarized light component in a direction perpendicular to the illuminating optical axis 100ax. The polarization converting element 140 also has a reflecting layer for reflecting the other linearly polarized light component reflected on the polarization separating layer in a direction parallel to the illuminating optical axis 100ax. The polarization converting element 140 further has a phase difference plate for converting the other linearly polarized light component reflected on the reflecting layer into one linearly polarized light component.

The superposing lens 150 is an optical element for converging the plural partial light beams transmitted through the first lens array 120, the second lens array 130 and the polarization converting element 140, and superposing the plural partial light beams near the image forming area S of the liquid crystal devices 400R, 400G, 400B. The superposing lens 150 shown in FIG. 1 is constructed by one lens, but may be also constructed by a composite lens provided by combining plural lenses.

The color separating light guide optical system 200 has a first dichroic mirror 210 and a second dichroic mirror 220, reflecting mirrors 230, 240, 250, an incident side lens 260 and a relay lens 270. The color separating light guide optical system 200 has a function for separating the illuminating light beam emitted from the superposing lens 150 into three color lights of red light, green light and blue light, and guiding the respective color lights to the three liquid crystal devices 400R, 400G, 400B as an illuminating object.

The first dichroic mirror 210 and the second dichroic mirror 220 are optical elements each forming a wavelength selecting film for reflecting the light beam of a predetermined wavelength area onto a substrate, and transmitting the light beams of other wavelength areas. The first dichroic mirror 210 is a mirror for reflecting a red light component and transmitting the other color light components. The second dichroic mirror 220 is a mirror for reflecting a green light component and transmitting a blue light component.

The red light component reflected on the first dichroic mirror 210 is bent by a reflecting mirror 230, and is incident to the image forming area S of the liquid crystal device 400R for red light through a condenser lens 300R.

The condenser lens 300R is arranged to convert each partial light beam from the superposing lens 150 into a light beam approximately parallel to each principal ray. Condenser lenses 300G, 300B arranged at the former stages of optical paths of the other liquid crystal devices 400R, 400B are constructed similarly to the condenser lens 300R.

The green light component among the green light component and the blue light component passing through the first dichroic mirror 210 is reflected on the second dichroic mirror 220, and passes through the condenser lens 300G, and is incident to the image forming area S of the liquid crystal device 400G for green light. On the other hand, the blue light component is transmitted through the second dichroic mirror 220, and passes through the incident side lens 260, the reflecting mirror 240 of the incident side, the relay lens 270, the reflecting mirror 250 of the emitting side and the condenser lens 300B, and is incident to the image forming area S of the liquid crystal device 400B for blue light. The incident side lens 260, the relay lens 270 and the reflecting mirrors 240, 250 have a function for guiding the blue light component transmitted through the second dichroic mirror 220 until the liquid crystal device 400B.

Such incident side lens 260, relay lens 270 and reflecting mirrors 240, 250 are arranged in the optical path of blue light to prevent a reduction in utilization efficiency of light due to dispersion of light, etc. since the length of the optical path of the blue light is longer than the lengths of the optical oaths of the other color lights. In the projector 1000 in accordance with the embodiment mode, such a construction is set since the length of the optical path of the blue light is long. However, a construction using the incident side lens 260, the relay lens 270 and the reflecting mirrors 240, 250 in the optical path of red light by lengthening the length of the optical path of the red light is also considered.

In the liquid crystal devices 400R, 400G, 400B, the illuminating light beam is modulated in accordance with image information, and a color image is formed, and it becomes an illuminating object of the light source device 110. Incident side polarizing plates are respectively interposed and arranged between the condenser lenses 300R, 300G, 300B and the respective liquid crystal devices 400R, 400G, 400B although these incident side polarizing plates are not shown in the drawings. Emitting side polarizing plates are respectively interposed and arranged between the respective liquid crystal devices 400R, 400G, 400B and the cross dichroic prism 500. Each incident color light is modulated by these incident side polarizing plates, liquid crystal devices 400R, 400G, 400B and emitting side polarizing plates.

In the liquid crystal devices 400R, 400G, 400B, a liquid crystal as an electro-optic substance is sealed and enclosed in a pair of transparent glass substrates. For example, polysilicon TFT is set to a switching element, and the polarizing direction of the linearly polarized light of one kind emitted from the incident side polarizing plate is modulated in accordance with given image information.

The cross dichroic prism 500 as a color synthesizing optical system is an optical element for synthesizing an optical image modulated every each color light emitted from the emitting side polarizing plate, and forming a color image. This cross dichroic prism 500 approximately has a square shape seen from a plane and formed by sticking four rectangular prisms, and a dielectric multi-layer film is formed at an interface of an approximately X-shape constructed by mutually sticking the rectangular prisms. The dielectric multi-layer film formed at one interface of the approximately X-shape reflects the red light. The dielectric film formed at the other interface reflects the blue light. The red light and the blue light are bent by these dielectric multi-layer films, and their advancing directions are conformed to the advancing direction of the green light so that the three color lights are synthesized.

The color image emitted from the cross dichroic prism 500 is enlarged and projected by a projection optical system 600, and a large screen image is formed on screen SCR.

The projector 1000 in accordance with the embodiment mode is characterized in the position of a conjugate point C of the image forming area S in the liquid crystal devices 400R, 400G, 400B and the construction of each second small lens 132 in the second lens array 130. Effects of the projector 1000 in accordance with the embodiment mode will next be explained in detail by comparing and explaining the construction of the projector 1000 in the embodiment mode, the construction of a projector 1000a in comparison example 1 of the embodiment mode, and the construction of a projector 1000b in comparison example 2.

Figure 2A:
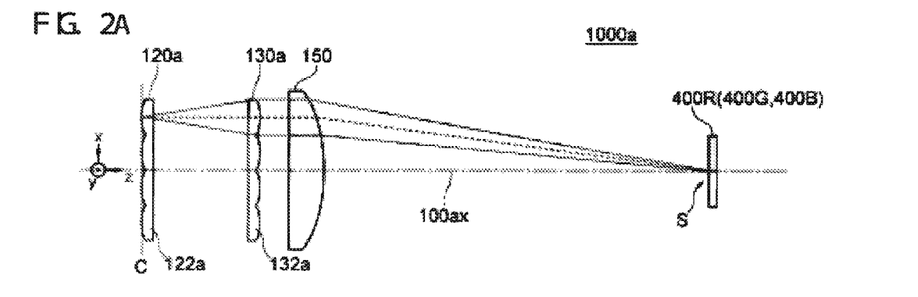
FIGS. 2A to 2C are conceptual views shown to explain effects of the projector 1000 in accordance with the embodiment mode.
Figure 2B:
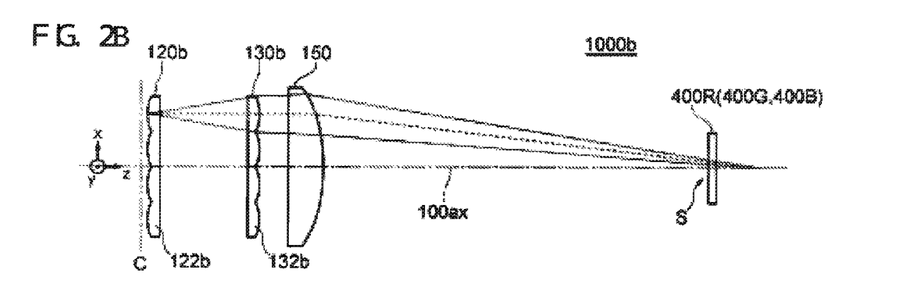
Figure 2C:
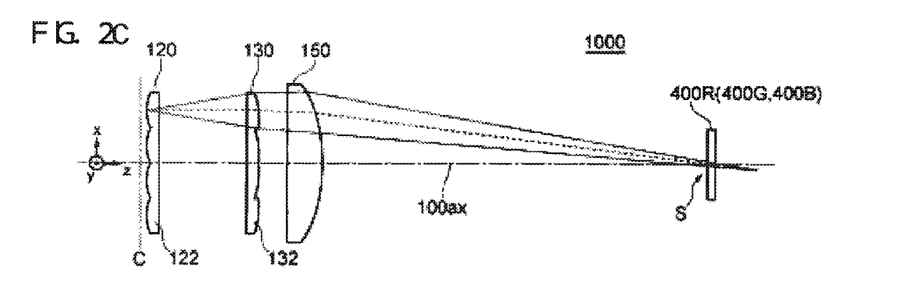

FIGS. 2A, 2B and 2C are conceptual views shown to explain the effects of the projector 1000 in accordance with the embodiment mode. FIG. 2A is a conceptual view shown to explain the projector 1000a in comparison example 1 of the embodiment mode. FIG. 2B is a conceptual view shown to explain the projector 1000b in comparison example 2 of the embodiment mode. FIG. 2C is a conceptual view shown to explain the projector 1000 in the embodiment mode.

In FIGS. 2A to 2C, only the first lens array, the second lens array, the superposing lens and the liquid crystal devices (image forming area S) in each optical system in the projector are shown and the other optical systems (polarization converting element, etc.) are omitted to easily make the explanation.

Figure 3A:
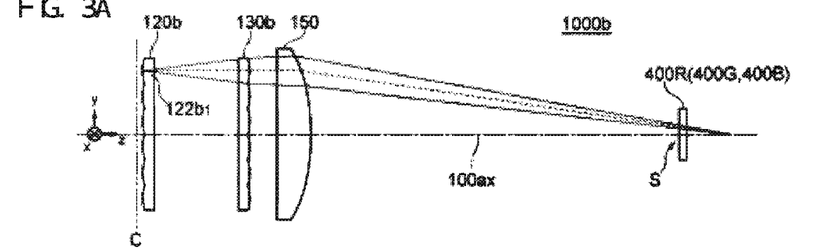
FIGS. 3A to 3D are conceptual views shown to explain a projector 1000*b* in accordance with comparison example 2 of the embodiment mode.
Figure 3B:
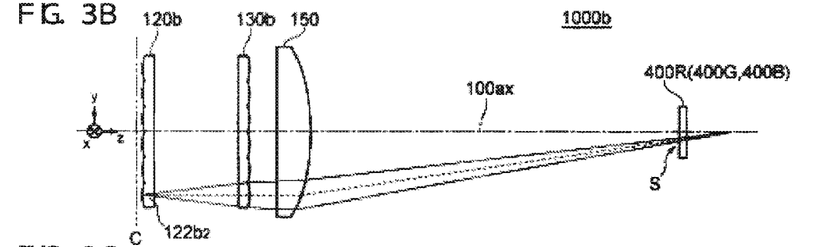
Figure 3C:
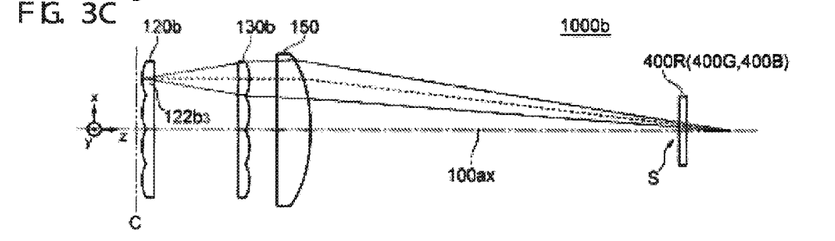
Figure 3D:
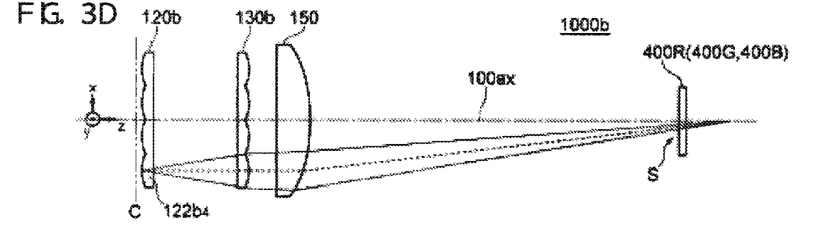

FIGS. 3A, 3B, 3C and 3D are conceptual views shown to explain the projector 1000b in comparison example 2 of the embodiment mode. FIG. 3A is a conceptual view showing a principal ray of a partial light beam passing through a first small lens 122b$_1$ arranged above the illuminating optical axis 100ax. FIG. 3B is a conceptual view showing a principal ray of a partial light beam passing through a first small lens 122b$_2$ arranged below the illuminating optical axis 100ax. FIG. 3C is a conceptual view showing a principal ray of a partial light beam passing through a first small lens 122b$_3$ arranged leftward from the illuminating optical axis 100ax. FIG. 3D is a conceptual view showing a principal ray of a partial light beam passing through a first small lens 122b$_4$ arranged rightward from the illuminating optical axis 100ax.

Figure 4A:
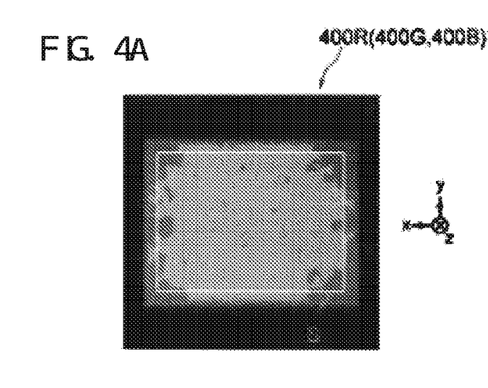
FIGS. 4A and 4B are views shown to explain the effects of the projector 1000 in accordance with the embodiment mode.
Figure 4B:
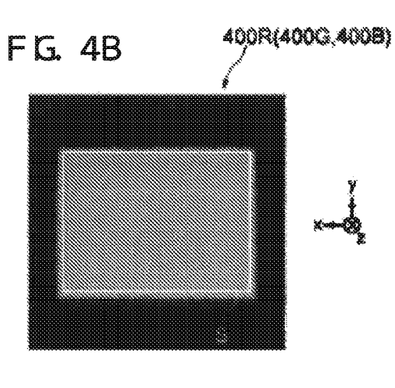

FIGS. 4A and 4B are views shown to explain effects of the projector 1000 in accordance with the embodiment mode. FIG. 4A is a view showing an in-plane light intensity distribution of the image forming area S in the case of the projector 1000b in comparison example 2 of the embodiment mode. FIG. 4B is a view showing an in-plane light intensity distribution of the image forming area S in the case of the projector 1000 in accordance with the embodiment mode.

The projector 1000a in comparison example 1 basically has a construction similar to that of the projector 1000 in accordance with the embodiment mode, but differs from the projector 1000 in accordance with the embodiment mode in the position of a conjugate point C of the image forming area S in the liquid crystal device and the construction of each second small lens in the second lens array. Namely, in the projector 1000a in comparison example 1, as shown in FIG. 2A, the conjugate point C of the image forming area S in the liquid crystal devices 400R, 400G, 400B is located at the vertex of a lens curved surface in each first small lens 122a of the first lens array 120a. Further, each second small lens 132a of the second lens array 130a is not eccentric. The projector 1000a in comparison example 1 has a construction similar to that of the projector 1000 in accordance with the embodiment mode except for the position of the conjugate point C of the image forming area S in the liquid crystal device and the construction of each second small lens in the second lens array.

In the projector 1000a in comparison example 1, the conjugate point C of the image forming area S in the liquid crystal devices 400R, 400G, 400B is located at the vertex of the lens curved surface in each first small lens 122a of the first lens array 120a. Therefore, for example, when dust is attached to the lens curved surface of the first small lens 122a and a flaw, etc. exist on the lens curved surface, images of such dust, a flaw, etc. are focused and formed on the image forming area S. Therefore, the images of the dust, the flaw, etc. are also included within an image projected on the screen SCR so that image quality of the projecting image is reduced.

There is the projector 1000b in comparison example 2 as a projector able to solve such a problem point in the projector 1000a in comparison example 1.

The projector 1000b in comparison example 2 basically has a construction similar to that of the projector 1000a in comparison example 1, but differs from the projector 1000a in comparison example 1 in the position of the conjugate point C of the image forming area S in the liquid crystal device. Namely, in the projector 1000b in comparison example 2, as shown in FIG. 2B, the conjugate point C of the image forming area S in the liquid crystal devices 400R, 400G, 400B is located on the light source device 110 side from the vertex of the lens curved surface in each first small lens 122a of the first lens array 120a. The projector 1000b in comparison example 2 has a construction similar to that of the projector 1000a in comparison example 1 except for the position of the conjugate point C of the image forming area S in the liquid crystal device.

In accordance with the projector 1000b in comparison example 2, the conjugate point C of the image forming area S is located on the light source device 110 side from the vertex of the lens curved surface in each first small lens 122b of the first lens array 120b. Therefore, the image forming area S and the vertex of the lens curved surface of the first small lens 122b are not set to a conjugate relation. Accordingly, even when dust is attached to the lens curved surface of the first small lens 122b and a flaw, etc. exist on the lens curved surface, it is restrained that images of such dust, a flaw, etc. are focused and formed on the image forming area S. As its result, it is possible to restrain that the images of the dust, the flaw, etc. are projected within an image projected on the screen SCR. Thus, it is possible to restrain that image quality of the projecting image is reduced.

However, in the projector 1000b in comparison example 2, there are problems as shown below. Namely, in accordance with the projector 1000b in comparison example 2, the conjugate point C of the image forming area S is located on the light source device 110 side from the vertex of the lens curved surface in each first small lens 122b of the first lens array 120b. Therefore, as shown in FIG. 2B, the forming position of an image of each first small lens 122b in the first lens array 120b is not located on the image forming area S, but becomes a position shifted on the projection optical system 600 side from the image forming area S. Therefore, each principal ray of the partial light beam passing through each first small lens 122b in the first lens array 120b passes a position shifted from an approximately central portion of the image forming area S without passing through the approximately central portion of the image forming area S on the image forming area S.

A concrete explanation will be made by using FIGS. 3A to 3D. When the conjugate point C of the image forming area S is located on the light source device 110 side from the vertex of the lens curved surface in each first small lens 122b of the first lens array 120b, the principal ray of the partial light beam passing through the first small lens $122b_1$ arranged above the illuminating optical axis 100ax passing the approximately central portion of the first lens array 120b passes a position shifted in the upward direction from the approximately central portion of the image forming area S (see FIG. 3A). The principal ray of the partial light beam passing through the first small lens $122b_2$ arranged below the illuminating optical axis 100ax passes a position shifted in the downward direction from the approximately central portion of the image forming area S (see FIG. 3B). The principal ray of the partial light beam passing through the first small lens $122b_3$ arranged leftward (the leftward direction seen from the light source device 110 side) from the illuminating optical axis 100ax passes a position shifted in the leftward direction from the approximately central portion of the image forming area S (see FIG. 3C). The principal ray of the partial light beam passing through the first small lens $122b_4$ arranged rightward the rightward direction seen from the light source device 110 side) from the illuminating optical axis 100ax passes a position shifted in the rightward direction from the approximately central portion of the image forming area S (see FIG. 3D).

Therefore, it becomes difficult to superpose all of the respective partial light beams emitted from the plural first small lenses 122b of the first lens array 120b on the image forming area S so that the uniform degree of light irradiated to the image forming area S is reduced. Further, the light amount of the illuminating light beam irradiated to an area outside the image forming area S is increased, and utilization efficiency of light in the image forming area S is reduced (see FIG. 4A).

As its result, it becomes difficult to obtain uniform and bright in-plane display characteristics on the screen SCR.

The projector 1000 in accordance with the embodiment mode in the invention solves both the problem point in the projector 1000a in comparison example 1 and the problem point in the projector 1000b in comparison example 2 explained above.

In accordance with the projector 1000 in the embodiment mode, as shown in FIG. 2C, the conjugate point C of the image forming area S is located on the light source device 110 side from the vertex of the lens curved surface in each first small lens 122 of the first lens array 120. Therefore, the image forming area S and the vertex of the lens curved surface of the first small lens 122 are not set to a conjugate relation. Even when dust is attached to the lens curved surface of the first small lens 122 and a flaw, etc. exist on the lens curved surface, it is restrained that images of such dust, a flaw, etc. are focused and formed on the image forming area S. As its result, it is possible to restrain that the images of the dust, the flaw, etc. are projected within an image projected on the screen SCR, and also restrain that image quality of the projecting image is reduced.

Further, in accordance with the projector 1000 in the embodiment mode, an eccentric amount of each second small lens 132 in the second lens array 130 is adjusted such that each principal ray of the partial light beam passing through each first small lens 122 in the first lens array 120 passes the approximately central portion of the image forming area S on the image forming area S. Therefore, as shown in FIG. 2C, each principal ray of the partial light beam passing through each first small lens 122 in the first lens array 120 passes the approximately central portion of the image forming area S on the image forming area S.

Therefore, even when the forming position of an image of each first small lens 122 in the first lens array 120 is a position shifted on the light source device 110 side from the image forming area S, all of the respective partial light beams emitted from the plural first small lenses 122 of the first lens array 120 can be superposed on the image forming area S. Therefore, the reduction of the uniform degree of light irradiated to the image forming area S can be restrained. Further, since an increase of the light amount of the illuminating light beam irradiated to an area outside the image forming area S can be restrained, a reduction of utilization efficiency of light in the image forming area S can be restrained (see FIG. 4B).

As its result, uniform and bright in-plane display characteristics can be obtained on the screen SCR.

Thus, the projector 1000 in accordance with the embodiment mode becomes a projector able to restrain that image quality of the protecting image is reduced since dust is attached to the lens curved surface of the first small lens 122 and a flaw, etc. exist on the lens curved surface. The projector 1000 also becomes a projector able to obtain the uniform and bright in-plane display characteristics on the screen SCR.

In the projector 1000 in accordance with the embodiment mode, the distance between the conjugate point C of the image forming area S and the vertex of the lens curved surface in each first small lens 122 of the first lens array 120 is set so as to become 1.5 mm.

When the distance between the conjugate point C of the image forming area S and the vertex of the lens curved surface in each first small lens 122 of the first lens array 120 is less then 0.5 mm and dust is attached to the lens curved surface of the first small lens 122 and a flaw, etc. exist on the lens curved surface, there is a possibility that images of such dust, a flaw, etc. are focused and formed on the image forming area S. On the other hand, when the distance between the conjugate point C of the image forming area S and the vertex of the lens curved surface in each first small lens 122 of the first lens array 120 exceeds 5.0 mm, the image of each first small lens 122 in the first lens array 120 is focused and formed in a position comparatively greatly separated from the image forming area S. Therefore, the light amount of the illuminating light beam irradiated to the area outside the image forming area S is further increased. When the image of each first small lens 122 in the first lens array 120 is focused and formed in the position comparatively greatly separated from the image forming area S in this way, it is not easy to adjust the eccentric amount of each second small lens 132 in the second lens array 130 such that each principal ray of the partial light beam passing through each first small lens 122 in the first lens array 120 passes the approximately central portion of the image forming area S on the image forming area S.

From the above viewpoint, the distance between the conjugate point C of the image forming area S and the vertex of the lens curved surface in each first small lens 122 of the first lens array 120 preferably lies within a range of 0.5 mm to 5.0 mm, and more preferably lies within a range of 1.0 mm to 3.0 mm.

In the projector 1000 in accordance with the embodiment mode, as shown in FIG. 2C, the conjugate point C of the image forming area S is located within the air, i.e., does not exist within the first lens array 120 (within an optical medium of the first lens array 120). Therefore, even when an air bubble, a flaw, etc. exist within the first lens array 120, it is possible to restrain that images of such an air bubble, a flaw, etc. are focused and formed on the image forming area S. As its result, it is possible to restrain that the images of the air bubble, the flaw, etc. are projected within an image projected onto the screen SCR, and further restrain that image quality of the projecting image is reduced.

In the projector 1000 in accordance with the embodiment mode, the polarization converting element 140 is further arranged between the second lens array 130 and the superposing lens 150, and emits each partial light beam divided by the first lens array 120 as linearly polarized light of about one kind uniformed in the polarizing direction. Therefore, the projector 1000 in accordance with the embodiment mode is particularly adapted for a projector having an electro-optic modulator of a type for modulating polarized light, e.g., an electro-optic modulator using a liquid crystal panel.

The projector 1000 in accordance with the embodiment mode has the three liquid crystal devices 400R, 400G, 400B for respectively modulating the three color lights of red light, green light and blue light in accordance with image information as the electro-optic modulator. The projector 1000 further has the color separating light guide optical system 200 for separating the illuminating light beam from the illuminating device 100 into three color lights, and guiding the color lights to the respective three liquid crystal devices 400R, 400G, 400B. The projector 1000 further has the cross dichroic prism 500 for synthesizing the respective color lights modulated by the three liquid crystal devices 400R, 400G, 400B and emitting the color lights to the projection optical system 600. Therefore, the projector able to restrain the reduction of image quality of the projecting image caused since dust is attached to the lens curved surface of the first small lens and a flaw, etc. exist on the lens curved surface, can be set to a full color projector of a three-plate type excellent in image quality.

The projector of the invention has been explained on the basis of the above embodiment mode. However, the invention is not limited to the above embodiment mode, but can be executed in various modes in the scope not departing from its features. For example, the following modifications can be performed.

(1) The projector 1000 of the above embodiment mode has been explained as an example with respect to the case in which the conjugate point C of the image forming area S of the liquid crystal device is located on the light source device 110 side from the vertex of the lens curved surface in each first small lens 122 of the first lens array 120. However, the invention is not limited to this case, but may be also set to a construction in which the conjugate point C of the image forming area S of the liquid crystal device is located on the projection optical system 600 side from the vertex of the lens curved surface in each first small lens 122 of the first lens array 120.

(2) In the projector 1000 of the above embodiment mode, both the projector 1000*a* in accordance with comparison example 1 and the projector 1000*b* in accordance with comparison example 2 use each second small lens in the second lens array set not to be eccentric so as to easily make the explanation. In this explanation, the effects of the invention are obtained by suitably eccentrically setting each second small lens (adjusting the eccentric amount) in the second lens array set not to be eccentric in this way. However, the invention is not limited to this construction. For example, in a projector having each second small lens set to be eccentric in the second lens array, the effects of the invention can be also obtained by further suitably adjusting the eccentric amount of each second small lens in the second lens array.

(3) The projector 1000 of the above embodiment mode is a projector of the so-called three-plate type having the three liquid crystal devices as the electro-optic modulator. However, the invention is not limited to this projector of the three-plate type, but can be also applied to a projector having one, two or four or more liquid crystal devices.

(4) The projector 1000 of the above embodiment mode is a projector of a transmission type, but the invention is not limited to this type. The invention can be also applied to a projector of a reflection type. Here, the "transmission type" means that the electro-optic modulator as an optical modulating means such as the electro-optic modulator of the transmission type, etc. is a type for transmitting light. The "reflection type" means that the electro-optic modulator as an optical modulating means such as the electro-optic modulator of the reflection type is a type for reflecting light. Effects similar to those of the projector of the transmission type can be also obtained when this invention is applied to the projector of the reflection type.

(5) In the projector 1000 of the above embodiment mode, the liquid crystal device using the liquid crystal panel is used as the electro-optic modulator, but the invention is not limited to this liquid crystal device. Incident light may be generally modulated in accordance with image information as the electro-optic modulator, and a micro mirror type optical modulator, etc. may be also utilized. For example, DMD (digital micro mirror device) (trademark of TI corporation) can be used as the micro mirror type optical modulator.

(6) In the projector 1000 of the above embodiment mode, the light source device having the elliptical face reflector 114, the light emitting tube 112 having a light emitting center near a first focal point of the elliptical face reflector 114, and the concave lens 118 for emitting convergent light reflected on the elliptical face reflector 114 toward the first lens array 120 is used as the light source device 110. However, the invention is not limited to this light source device, but it is also possible to preferably use a light source device having a parabolic reflector and a light emitting tube having a light emitting center near the focal point of the parabolic reflector.

(7) In addition to this, the invention can be also applied to a front projecting type projector for performing projection from an observing side of the projecting image, and a rear projecting type projector for performing projection from the side opposed to the observing side of the projecting image.

Further, while this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

The priority applications Numbers JP2005-299718 upon which this patent application is based is hereby incorporated by reference.

What is claimed is:

1. A projector comprising:
an illuminating device having a light source device that emits an illuminating light beam on the side of an illuminated area; a first lens array having plural first small lenses that divides the illuminating light beam emitted from the light source device into plural partial light beams; a second lens array having plural second small lenses corresponding to the plural first small lenses; and a superposing lens that superposes the respective partial light beams emitted from the plural second small lenses in the illuminated area;
an electro-optic modulator that modulates the illuminating light beam from the illuminating device; and
a projection optical system that projects the illuminating light beam modulated by the electro-optic modulator;
wherein a conjugate point of an image forming area in the electro-optic modulator being located on the light source device side or the projection optical system side from the vertex of a lens curved surface in each first small lens of the first lens array; and
an eccentric amount of each second small lens in the second lens array being adjusted such that each principal ray of the partial light beam passing through each first small lens in the first lens array passes an approximately central portion of the image forming area on the image forming area of the electro-optic modulator.

2. The projector according to claim 1, wherein the distance between the conjugate point and the vertex of the lens curved surface in each first small lens of the first lens array lying within a range of 0.5 mm to 5.0 mm.

3. The projector according to claim 1, wherein the conjugate point being located within the air.

4. The projector according to claim 1, further comprising a polarization converting element arranged between the second lens array and the superposing lens, and emitting each partial light beam divided by the first lens array as linearly polarized light of about one kind uniformed in a polarizing direction.

5. The projector according to claim 1, further comprising:
plural electro-optic modulators that modulates respective plural color lights in accordance with image information as the electro-optic modulator;
a color separating light guide optical system that separates the illuminating light beam from the illuminating device into plural color lights, and guides the color lights to the respective plural electro-optic modulators; and
a color synthesizing optical system that synthesizes the respective color lights modulated by the plural electro-optic modulators, and emitting the color lights to the projection optical system.

* * * * *